W. W. TERRY.
TROLLEY WIRE SPLICE RUNNER.
APPLICATION FILED MAY 25, 1922.
1,431,340.
Patented Oct. 10, 1922.
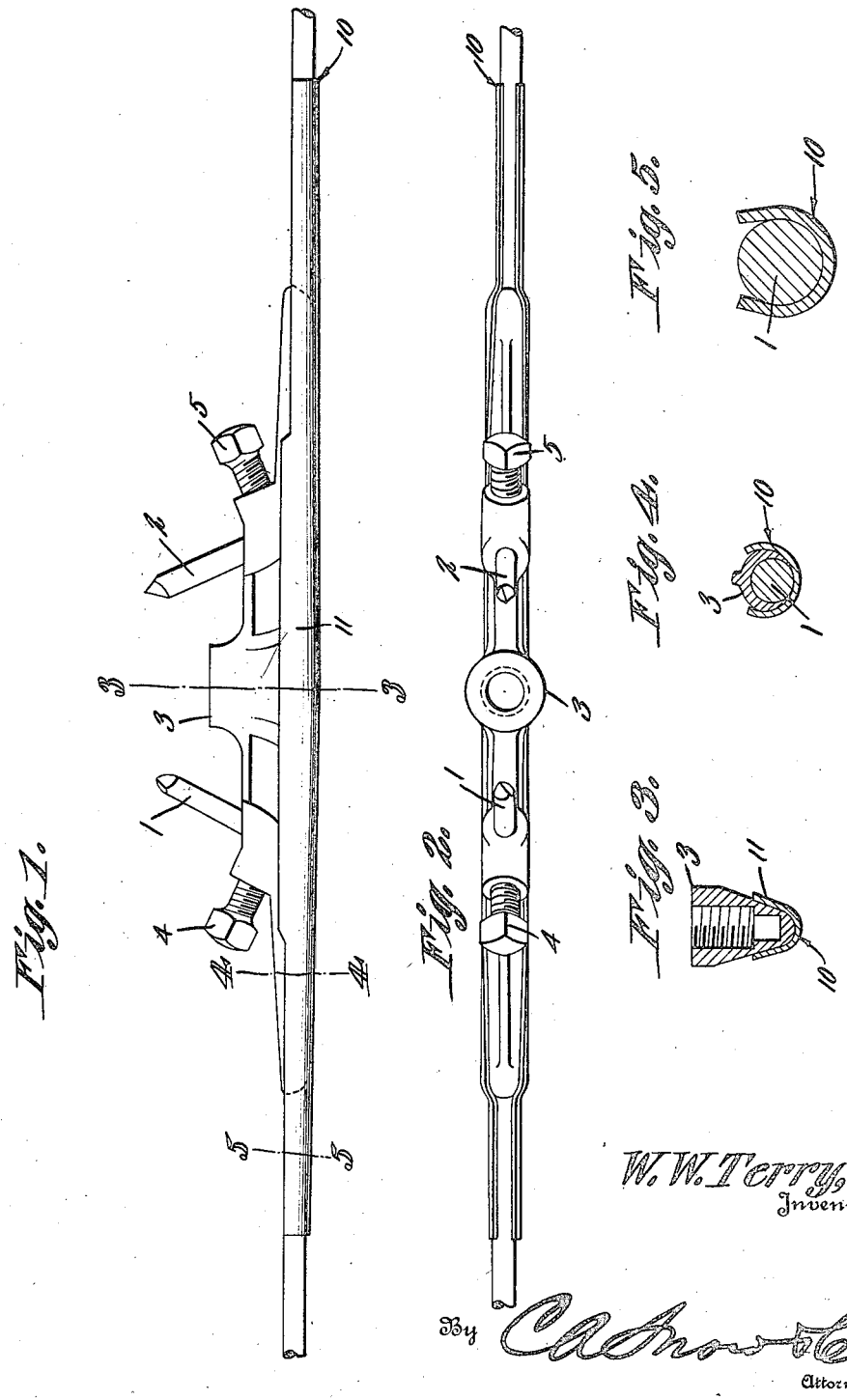

Patented Oct. 10, 1922.

1,431,340

UNITED STATES PATENT OFFICE.

WILLIAM W. TERRY, OF PORTSMOUTH, VIRGINIA.

TROLLEY-WIRE-SPLICE RUNNER.

Application filed May 25, 1922. Serial No. 563,653.

*To all whom it may concern:*

Be it known that I, WILLIAM W. TERRY, a citizen of the United States, residing at Portsmouth, in the county of Norfolk and State of Virginia, have invented a new and useful Trolley-Wire-Splice Runner, of which the following is a specification.

This invention relates to trolley wire splicers, and more particularly to runners used in connection therewith.

The splicers in use at the present time are unsatisfactory for the reason that the edges which come in contact with the riding wheel of the trolley pole wear out very readily, and it is the object of this invention to overcome this objection by providing a runner for use in connection with a splice of this character which will effectively protect the splice and which when worn, may be readily replaced at a minimum cost, and in a very few minutes.

With the foregoing and other objects in view which will appear as the description proceeds, the invention resides in the combination and arrangement of parts and in the details of construction hereinafter described and claimed, it being understood that changes in the precise embodiment of the invention herein disclosed, may be made without departing from the spirit of the invention.

In the accompanying drawings:—

Figure 1 represents a side elevation of a trolley wire splice equipped with this invention.

Fig. 2 is a plan view thereof.

Fig. 3 is a central vertical section taken on the line 3—3 of Fig. 1.

Fig. 4 is a similar view taken on the line 4—4 of Fig. 1, and

Fig. 5 is a similar view taken on the line 5—5 of Fig. 1.

In the embodiment illustrated, the ends of the trolley wire to be connected are shown at 1 and 2 connected by a standard splice ear 3 which is of usual construction, the ends 1 and 2 being clampingly held engaged therewith by set screws 4 and 5. This splice ear 3, when used without a runner or protector, wears especially at the shoulder where the stud bolt enters, and at which point all breaks occur. The runner 10 constituting this invention is preferably made of a malleable alloy of copper, and is substantially boat-shaped or trough-shaped in form, tapering toward its opposite ends to adapt it to fit snugly around the splice 3 and the wires to be connected by the splice, as is shown clearly in Figs. 1 and 2. This runner 10 is preferably made deeper at the central enlarged portion 11 thereof, as shown in Fig. 1, and both the body portion and the tapered ends are U-shaped in form to adapt them to straddle the lower faces of the splice and the wires respectively, as shown in Figs. 1 and 2. This runner after being applied, is preferably crimped around the splice as shown in Fig. 4, whereby it is securely held engaged with the splice, and yet may be readily removed therefrom when desired. Owing to the crimping of the runner around the splice, no auxiliary fastening means are necessary, thereby greatly simplifying the construction of the device, and yet effecting a firm grip thereof on the splice and the wire.

Owing to the thinness of the metal from which the runner is constructed, the smooth riding of the trolley wheel over the ends thereof is insured.

It will be of course understood that when the runner 10 becomes worn to such an extent as to be ineffective for protecting the splice, it may be easily removed and another substituted, requiring only two minutes, more or less, to take off one and apply another.

The extreme simplicity of the device adapts it to be very cheaply constructed and sold.

I claim:—

1. The combination with a standard splice ear for trolley wires, of a protective runner therefor, shaped to fit under said ear and to extend beyond the splice and clampingly engage the wires to be connected.

2. The combination with a standard splice ear for trolley wires, of a protective runner therefor, shaped to fit under said ear and to extend beyond the splice and engage the wires to be connected, said runner being substantially boat-shaped in form, tapering toward its opposite ends and clampingly engaged with said wires.

3. The combination with a standard splice ear for trolley wires, of a protective runner therefor, shaped to fit under said ear and to extend beyond the splice and engage the wires to be connected, said runner being substantially boat-shaped in form, tapering toward its opposite ends, the central portion of the runner being deeper than the ends thereof.

4. A boltless runner for a splice ear comprising a trough-shaped member tapering toward its opposite ends and adapted to straddle and clampingly engage the ear in connection with which it is to be used.

In testimony that I claim the foregoing as my own, I have hereto affixed my signature in the presence of two witnesses.

WILLIAM W. TERRY.

Witnesses:
G. L. GORDON,
S. J. COPE.